Jan. 25, 1955
M. KAPLAN
2,700,699
SYNCRO-SWEEP GENERATOR
Filed June 20, 1950
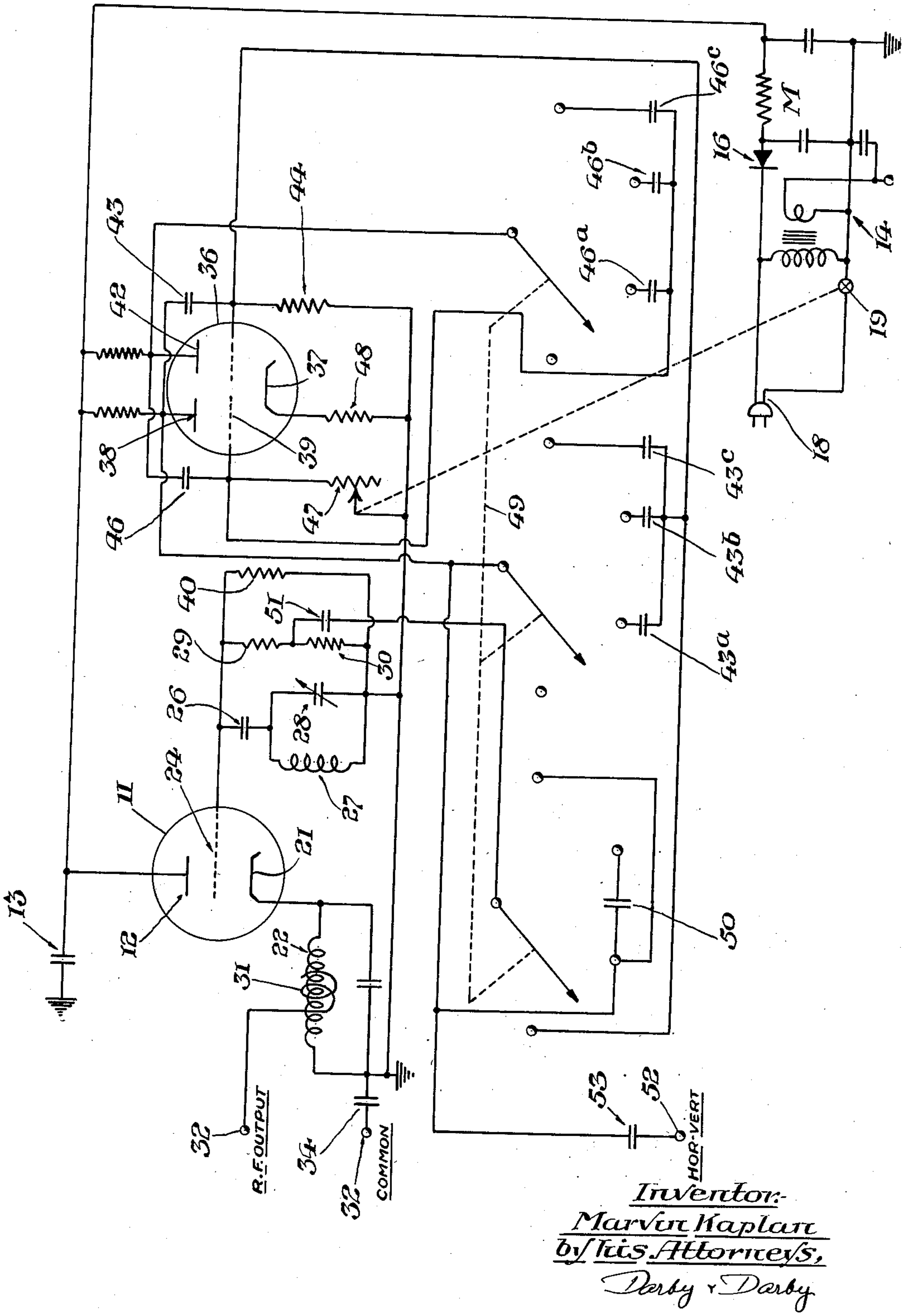
Inventor:
Marvin Kaplan
by His Attorneys,
Darby & Darby United States Patent Office 2,700,699

Patented Jan. 25, 1955

2,700,699

SYNCHRO-SWEEP GENERATOR

Marvin Kaplan, New York, N. Y., assignor to Video Television, Inc., New York, N. Y., a corporation of New York Application June 20, 1950, Serial No. 169,261

5 Claims. (Cl. 178—7.5)

The present invention is concerned with testing instruments particularly adapted to checking the performance and operation of television receivers.

In checking the performance of the circuits of television receivers, the problems encountered are considerably different from those in ordinary radio receivers, particularly because of the added complications of the circuits supplying the picture tube with its operating potentials. A test device satisfactory for use with television receivers must be able to check not only the normal picture signal receiving channels, such as the antenna circuit, radio frequency amplifier, frequency converter, intermediate frequency amplifier, detector and video amplifiers, but also must be able to check the synchronizing and sweep circuits for the picture tube and, in the case of those circuits where operating voltages are derived from the sweep circuits, it must also check such voltage supply circuits.

In the past devices have been provided which can test and check some of the characteristics of the television receiver, but such test devices have been relatively complicated and costly and have been limited as to the portions of the television receiver which can be checked.

The present invention has as one of its particular aims the provision of a simple and inexpensive test device which will permit the testing and checking of a maximum portion of the television receiver. The present invention makes use of the highly useful method of signal tracing by which special signals are injected into various portions of the circuit to indicate the functioning of such circuits. In addition the present device affords greater economy by relying upon the picture tube of the receiver itself as its indicator to determine whether the receiver circuits are functioning properly.

Essentially the present invention constitutes a special form of signal generator which produces, in a relatively simple and inexpensive way, a variety of signals by the use of which trouble shooting among the television receiver circuits can be simply effected, and the receiver can be adjusted to optimum operation even while no television broadcasts are taking place.

Other objects and advantages of the present invention will become apparent from a consideration of the following specification and the appended drawing which, in its single figure, is a schematic circuit diagram of a preferred embodiment of the present invention.

The circuit of the present invention is comprised essentially of two separate sections, the first being a radio frequency oscillator section tunable over the range from 54 to 88 megacycles corresponding to standard television channels 2 to 5 inclusive, and the second section being a multivibrator pulse generator circuit producing outputs in the frequency range below 130 kilocycles for special purposes to be described.

The oscillator portion of the present circuit is a radio frequency grounded plate oscillator having a triode 11 with its anode 12 grounded for alternating currents through a condenser 13 and also coupled to the positive terminal of a power source or power pack 14 which, as shown, may constitute a selenium or other rectifier 16 and a filter circuit 17 coupled across the input power lines 18 through a power switch 19. The cathode 21 of triode 11 is grounded through a choke 22 shunted by a very small capacitance 23 of the order of 5 mmf., which minimizes parasitic R. F. oscillations. The grid 24 of triode 11 is also connected to ground through a capacitance 26 and a tuned circuit formed by an inductance 27, in parallel with a variable capacitance 28. This circuit is a complete radio frequency oscillator, which is designed to produce frequencies in the range from 54 to 88 megacycles per second, by adjustment of condenser 28. This radio frequency output is derived from a coil 31 capacitively coupled to the choke 22 and connected to the "R. F. output" terminal 22, the other output terminal being a "common" terminal 33 capacitively coupled to the grounded chassis of the device by a condenser 34.

The second section of the present test device is illustrated as a multivibrator circuit having a single tube 36 with two triode sections having a common cathode 37. The first section anode 38 is coupled to the second section grid 41 through a feed back condenser 43, the grid 41 also being connected to ground through a resistor 44. Similarly, the second section anode 42 is coupled to the first section grid 39 through a feed back condenser 46, the first section grid 39 being connected to ground through a variable resistor 48.

The feed back condensers 46 and 43 are selectively supplemented by further capacitance by means of a four-position three-pole selector switch 49, so as to vary the output frequency of the multivibrator 36. In position 1 of selector switch 49 only the condensers 43 and 46 are used. At the same time, the second section grid 41 is coupled through a condenser 51 to the junction of resistors 29 and 30 which are connected in series between the radio frequency oscillator grid 24 and ground. Another resistor 40 is connected between grid 24 and ground to minimize variation in operation of the oscillator due to change in modulation signal level or frequency. The condenser 51 and resistor 30 modify the sawtooth output of the multivibrator 36 to produce sharp pulses, which are suitable for synchronizing pulses or video signals, as will appear from the description below. The frequency of the multivibrator is now designed to be in the range from 90 to 130 kilocycles, over which range it can be adjusted by the variable resistance 47.

In position 2, a condenser **43*a* is coupled in parallel with condenser 43, and a condenser 46*a* is coupled in parallel with condenser 46, thereby causing the operating frequency of the multivibrator 36 to be in the range of from 400 to 1000 cycles. Also, the modulating signal applied to the oscillator 11 is now derived from anode 38 of the first section of the multivibrator 36**.

In position 3 of selector switch 49, condensers **43*b* and 46*b* are connected in parallel respectively with condensers 43 and 46. The multivibrator frequency is now in the range between 10 and 20 kilocycles and is applied to the radio frequency oscillator through a small condenser 50**, of the order of .0001 microfarad.

In position 4, condensers **43*c* and 46*c* are now connected across the condensers 43 and 46**, respectively, to produce a multivibrator output frequency in the range from 40 to 80 cycles.

In each of these cases the output of the multivibrator is modulated upon the oscillator output carrier as a pulse signal. The multivibrator output is also supplied to a further output terminal 52 through a blocking condenser 53. This latter terminal 52 is designated "Horizontal-vertical" because, as will be seen, it is a source of horizontal or vertical synchronizing or sweep voltages for testing receiver performance.

Essentially the output of the multivibrator is a sawtooth voltage as it appears at terminal 52. However, condenser 51 and resistor 30 serve as a sharpening circuit so that the voltage applied to the oscillator grid 24 is essentially a pulse. The oscillator output therefore is the radio frequency modulated by these pulses.

The uses to which the present circuit is put will now be described.

In position 1, the output derived from terminal 32 is a radio frequency adjustable in the range from 54 to 88 megacycles and modulated by a pulse wave in the frequency range from 90 to 130 kilocycles. The test device may be placed within a few feet of the receiver to be tested and in most cases a strong enough signal from the test device is supplied to the receiver merely by radiation. If additional signal strength is required, the common terminal 33 can be connected to the receiver chassis and the output terminal 32 is connected to one of the antenna terminals of the receiver. The receiver is now turned on and tuned to an unused channel in the range from channel 2 to 5. Since in any one location all of these channels are not allocated to broadcast transmitters, it will always be possible to find an unused channel in this range. The receiver contrast and brightness controls are adjusted to high clockwise positions, and the condenser 28 of the oscillator 11 is adjusted to produce the brightest picture on the receiver screen. The variable resistor 47 is then adjusted until a series of vertical black bars appears in steady position on the screen. This gives a check for horizontal linearity which is satisfactory if the bars are equaly spaced and centered. If not satisfactory, the horizontal linearity and width controls on the receiver may be adjusted for the proper condition. If the vertical bars move vertically, it may be necessary to adjust the vertical hold control in the set. In this way the horizontal linearity of the television receiver may be checked and adjusted.

To check or adjust vertical linearity, the test device is connected or coupled to the receiver in the same manner as just described, but with the selector switch 49 on position 2. In this position the multivibrator output is within the range from 400 to 1000 cycles, and provides a series of horizontal bars on the television screen. The variable resistor 47 is now adjusted until these horizontal bars appear steady, and proper vertical linearity will be indicated by uniformity of spacing between the bars. Again the vertical linearity and height controls may be adjusted until the bars are equally spaced and centered at the center of the receiver screen, which provides proper operation.

To check the horizontal synchronizing circuits of the receiver, the test device is connected or coupled to the receiver in the manner described above, but with the selector switch 49 in position 3. The variable resistor 47 is then adjusted until a steady single vertical wide bar is seen on the screen. This shows when the receiver radio frequency, video intermediate frequency, video detector, and video amplifier stages and the horizontal synchronizing amplifiers are performing normally and the horizontal hold control in the receiver can now be adjusted to lock-in the input test signal from the test device of the present invention. If the bar does not lock in place, it is an indication of a defect between the synchronizing signal take-off point, which is generally the video second detector or video amplifier, and the horizontal sawtooth generator or sweep circuit tube, and can be localized by injecting the signal from terminal 52 at various progressive stages (simultaneously with supplying the receiver antenna terminal from terminal 32) until the defect is found. If the bar does not appear on the receiver screen, the defect exists in the radio frequency, video intermediate frequency, video detector or video amplifier stages. The video amplifier stage can be checked by supplying to the video amplifier input a signal from the output "Horizontal-vertical" terminal 52 of the present test device, with the selector switch 49 in position 2, while the terminal 32 is coupled to the receiver antenna terminal, which should produce the horizontal black bars mentioned above. The other stages can be checked in conventional manner.

To check the vertical synchronizing circuits of the receiver, the same procedure is followed as in checking the horizontal circuits, except that the selector switch 49 is set at position 4 and the control 47 is adjusted to produce a single wide horizontal bar. If the receiver circuits are normal, the vertical hold control will be able to adjust and hold in the test signal. If the signal does not lock in, a defect exists between the sync takeoff point and the vertical sawtooth generator tube. By using the output from the terminal 52, these circuits of the receiver can be checked from point to point by injecting the vertical sync signal at each point and advancing it to the next point until the defective stage is located.

To check the horizontal sweep circuits the test device is set at selector switch position 3 with the television receiver off. Terminal 52 of the test device is connected to the high side of the horizontal deflection coil terminals and resistor 47 is adjusted for maximum voltage across the deflection coil, as may be determined by an output meter or an A. C. voltmeter connected in series with a condenser across these terminals. If the output from terminal 52 is now shifted to the anode of the horizontal output tube of the receiver, the meter reading will be the same if the horizontal output transformer primary and secondary windings are normal. The signal is now shifted to the grid of the horizontal output tube and the receiver is turned on. A considerable increase in the meter reading will indicate that horizontal output tube is amplifying and that any sweep failure in the receiver is probably caused by a defective horizontal sawtooth generator stage.

If the receiver has a high voltage supply operating from the horizontal sweep circuit, sometimes known as a "flyback" type of high voltage supply, there may also be no high voltage. The preceding procedure will produce the necessary high voltage despite a defective horizontal sawtooth generator stage, to permit operation of the receiver for testing.

To check the vertical sweep circuits, a similar procedure is followed, but with the selector switch 49 at position 4. If upon injecting the test signal into the grid of the vertical output tube and turning the receiver on, the reading on the meter connected across the vertical sweep deflection coil increases considerably, it is indicated that the sweep failure in the set is probably caused by a defective sawtooth generator stage.

In the case of electrostatic deflection type receivers, it is unnecessary to adjust the variable resistor 47 for maximum reading on the meter as in the case of magnetic deflection systems, but the other steps can be followed as outlined above.

It will thus be seen by the use of this relatively simple and inexpensive circuit, providing either an R. F. signal, modulated by sync pulse or bar-producing video signals, or producing sawtooth sweep signals, both the overall video characteristics of the receiver and the individual sweep circuits can be readily checked, and the defect, if any localized and isolated to a particular stage or portion of the receiver. Also, in the case of properly functioning receivers, the present device provides a ready means for producing proper adjustments in the absence of actual broadcasts. For this purpose, when in selector switch position 3, it is desirable to mark the position of the variable control 47 at which a single vertical bar locks in with a picture actually being received when the test signal is also applied to the receiver antenna. Similarly, for position 4 of the selector switch 49, the setting of the variable control 47 producing a single bar superposed on a picture being received is noted. These settings then provide rough adjustments which would permit adjustment of the horizontal and vertical hold controls on the receiver even when broadcast stations are off the air.

It will also be appreciated that the present apparatus and the method of using it for receiver checking has considerable advantage in that it utilizes the receiver picture tube as an indicator: the images on the receiver screen during test give the necessary indications of the functioning of the receiver, eliminating any necessity for a separate oscilloscope.

It will be understood that the above circuit is illustrative only, the present invention not being limited thereto, but being defined solely by the appended claims.

What is claimed is:

1. A test device for television receivers or the like, comprising a sawtooth voltage generator for selectively producing sawtooth voltages of (*a*) the line frequency of a standard television signal, (*b*) the field frequency of said signal, (*c*) a multiple of said line frequency, or (*d*) a multiple of said field frequency; a radio frequency oscillator modulated by the output of said generator for producing an output modulated wave variable in frequency over at least two television channels not allocated to the same television broadcast area; and means for simultaneously deriving from said test device both said generator output and said modulated wave for test purposes.

2. A test device for television receivers or the like, comprising a sawtooth voltage generator for selectively producing sawtooth voltages of (*a*) the line frequency of a standard television signal, (*b*) the field frequency of said signal, (*c*) a multiple of said line frequency, or (*d*) a multiple of said field frequency; an output terminal coupled to said generator and supplied by said sawtooth voltages; a sharpening circuit coupled to the output of said sawtooth voltage generator for converting said sawtooth voltages into sharper voltage pulses; means including a radio frequency oscillator coupled to said sharpening circuit and supplied with said sharper voltage pulses, for producing a modulated output with a carrier frequency adjustable in frequency over at least two adjacent television channels; and another output terminal coupled to said oscillator and supplied with said modulated oscillator output; whereby sawtooth test voltages and modulated carrier test voltages are both available from said device.

3. A test device for television receivers or the like comprising a sawtooth voltage generator for selectively producing sawtooth voltages of any one of the following frequencies, (*a*) a frequency variable over a range including 60 cycles per second, (*b*) a multiple of the last-named frequency, (*c*) a frequency variable over a range including 15,750 cycles per second, and (*d*) a multiple of said last named frequency; a radio frequency oscillator modulated by the output of said generator to produce an output modulated wave, said oscillator having an output frequency variable over the range from 54 to 82 megacycles per second; and means for deriving simultaneously from said test device both the output of said generator and said modulated wave output of said oscillator for test purposes.

4. A test device for a television receiver or the like comprising a radio frequency oscillator tunable over a range including a plurality of television channel frequencies, a sawtooth generator having a frequency-determining condenser and a frequency-adjusting variable resistor providing an output sawtooth frequency for said sawtooth generator in a frequency range including approximately six to ten times the horizontal synchronizing frequency of said receiver, three further condensers, selector switch means for selectively coupling each of said further condensers in parallel with said first condensers, a first of said latter condensers having a capacitance additive to that of said former condenser to provide a sawtooth frequency in a frequency range including approximately six to sixteen times the vertical synchronizing frequency of said receiver, a second of said latter condensers having a capacitance additive to that of said former condenser to provide a sawtooth frequency in a range including said horizontal synchronizing frequency, and a third of said condensers having a capacitance additive to that of said former condenser to provide a sawtooth frequency in a range including said vertical synchronizing frequency, a coupling from said sawtooth generator to said radio frequency oscillator for modulating said oscillator output by said sawtooth generator output, a radio frequency output test terminal coupled to an electrode of said oscillator, and a synchronizing signal output test terminal coupled to said sawtooth generator, whereby said modulated radio frequency output may be derived from said first terminal and said sawtooth output may be separately or simultaneously derived from said second terminal.

5. The method of checking the linearity and synchronization of a television receiver or the like having deflection elements, a deflection transformer and a sweep circuit having an output tube, comprising the steps of generating a test sawtooth wave of substantially the sweep frequency of a standard television receiver, then, with the receiver under check completely denergized, applying said test wave to the deflection elements of said receiver under check, measuring the voltage at said deflection elements, then removing said test wave therefrom and applying it to the input of said deflection transformer, again measuring the voltage at said deflection elements, transferring said test wave to the input of the sweep circuit output tube, energizing said receiver, and again measuring the voltage at said deflection elements.

References Cited in the file of this patent

FOREIGN PATENTS

| | | |
|---|---|---|
| 520,349 | Great Britain | Apr. 22, 1940 |
| 233,313 | Switzerland | Oct. 16, 1944 |

OTHER REFERENCES

"Electronics," January 1949, pages 154, 156 and 158; published by McGraw-Hill Book Co., New York, N. Y.

"Service," January 1950, page 16, article entitled: "TV Cross-Hatch Generator."